Dec. 29, 1931.   A. E. ELSEA   1,838,477
GAS TURBINE
Filed Jan. 5, 1929   6 Sheets-Sheet 1

INVENTOR:
ALBERT E. ELSEA.
BY Harry L. Beimes
ATTORNEY.

Dec. 29, 1931.  A. E. ELSEA  1,838,477

GAS TURBINE

Filed Jan. 5, 1929  6 Sheets-Sheet 2

Fig. 2.

INVENTOR:
ALBERT E. ELSEA.

BY Harry A. Beimer
ATTORNEY.

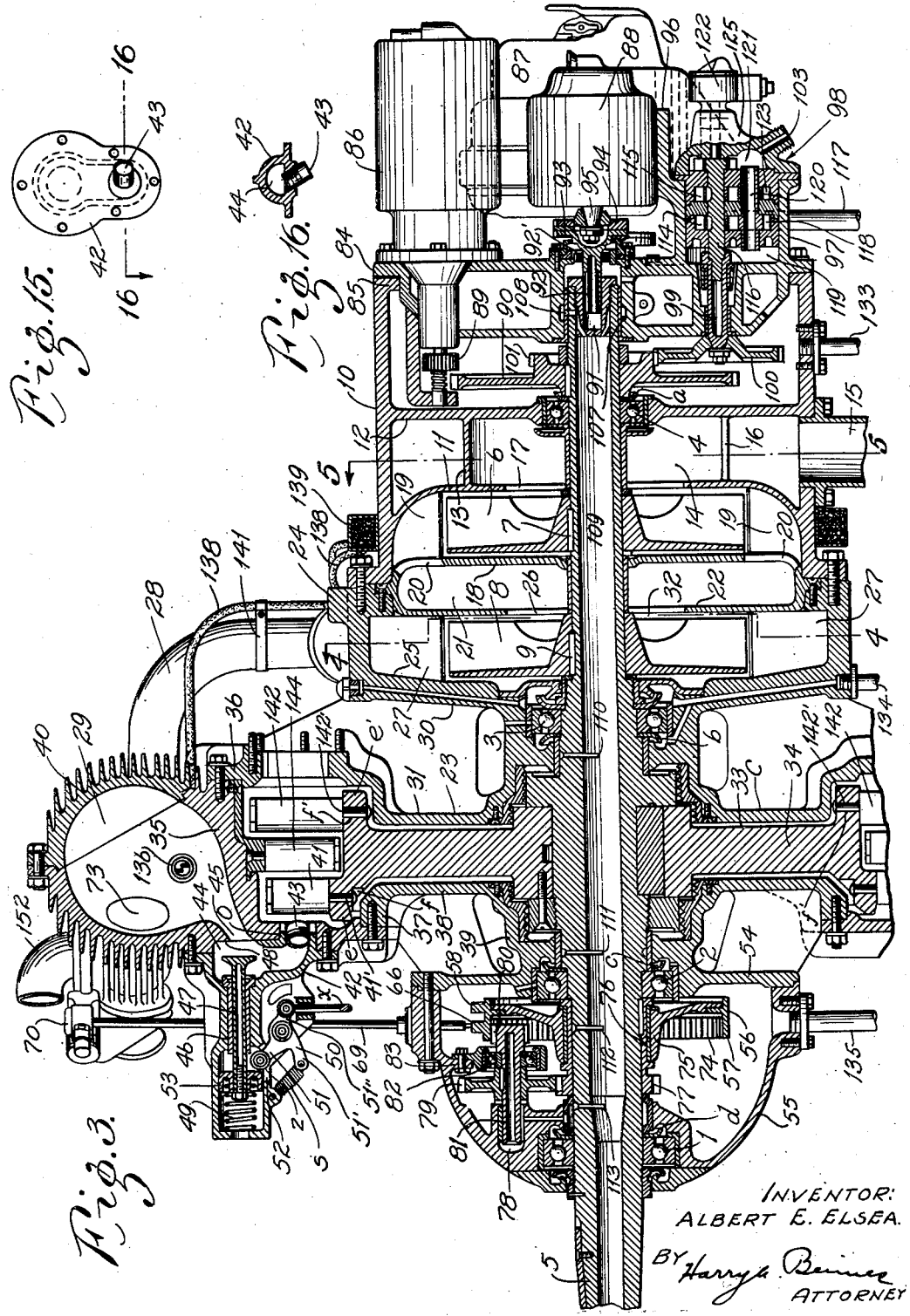

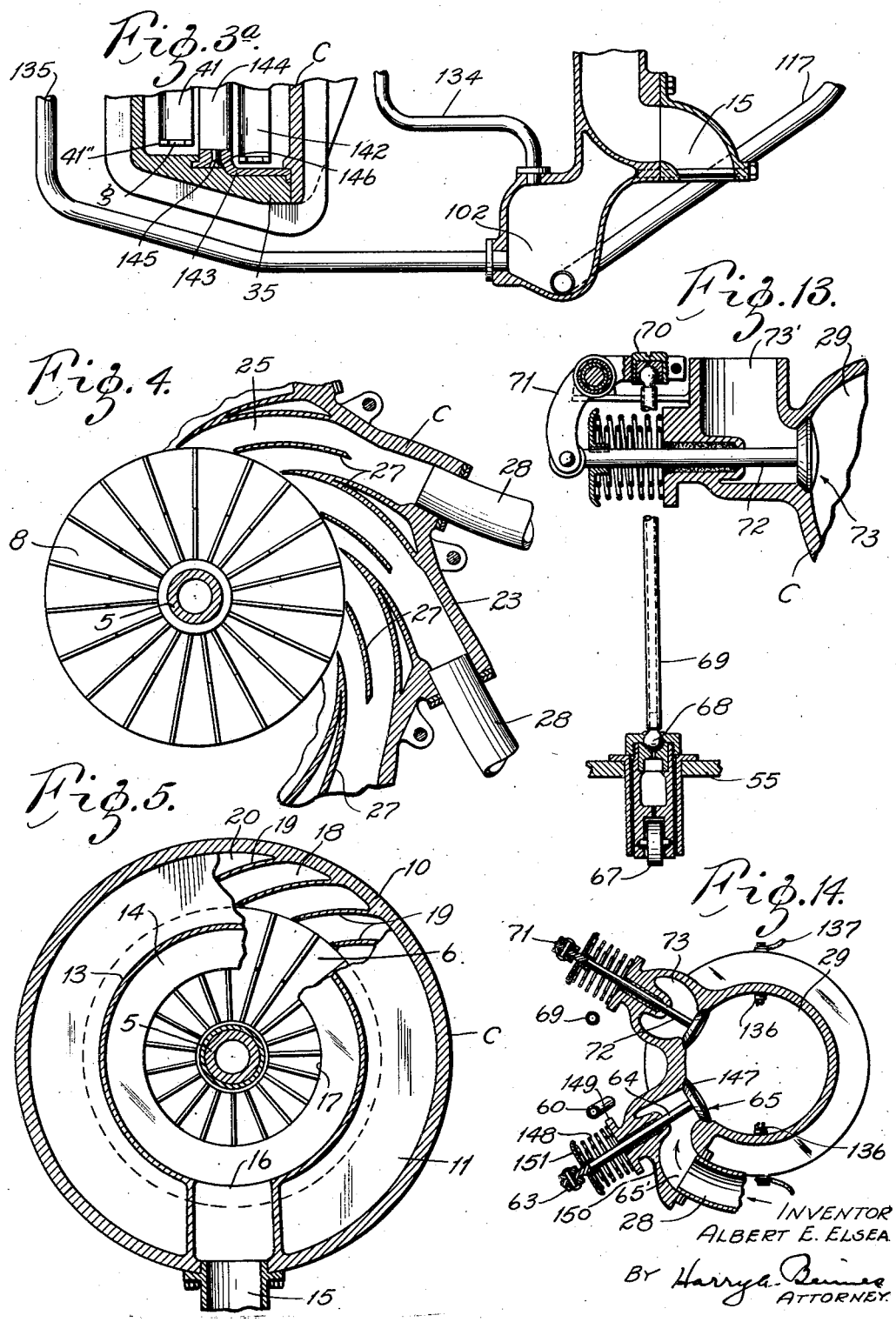

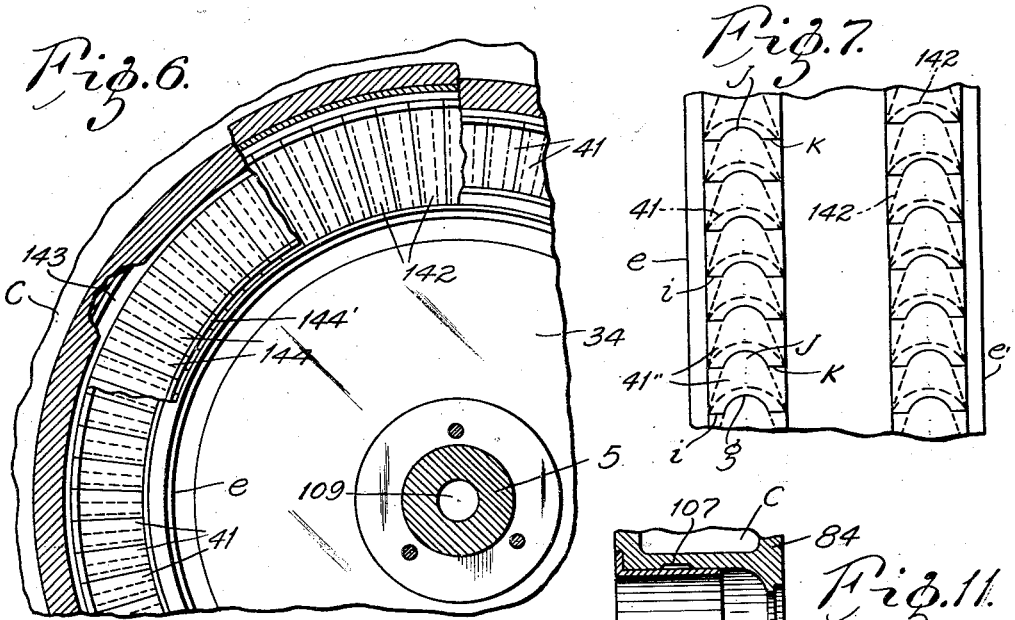

Dec. 29, 1931.  A. E. ELSEA  1,838,477
GAS TURBINE
Filed Jan. 5, 1929   6 Sheets-Sheet 6

INVENTOR
ALBERT E. ELSEA
BY Harry Benner
ATTORNEY.

Patented Dec. 29, 1931

1,838,477

UNITED STATES PATENT OFFICE

ALBERT E. ELSEA, OF EAST ST. LOUIS, ILLINOIS

GAS TURBINE

Application filed January 5, 1929. Serial No. 330,511.

My invention has relation to improvements in gas turbines and it consists of the novel features of construction more fully set forth in the specification and pointed out in the claims.

Among the objects of the present invention are the following:

1. To provide a gas turbine having a plurality of radially disposed combustion chambers so that numerous power impulses may be imparted to the rotor with each revolution thereof.

2. To provide a flow of cool air or other scavenging gas through the turbine buckets immediately after each power impulse for sufficient time to keep the buckets at comparatively low temperature.

3. To construct the turbine wheel in a manner to prevent warping to which end the buckets are dove-tailed together to form a continuous rim at the outer periphery of each set.

4. To provide an automatically operated valve leading to the jet nozzle which will open instantly at the initial increase in pressure in the combustion chamber following ignition of the fuel charge.

5. To provide a compressor (preferably in two stages) for compressing the charge in the combustion chamber and mounting the blades of said compressor directly on the engine shaft in juxtaposition to the turbine wheel whereby a compact structure results.

6. To assemble all of the parts embodied in the turbine in a compact closely knit structure of comparative simplicity and light weight.

7. To provide a turbine construction wherein the amount of pressure and vacuum resistance will be reduced to a minimum.

8. To provide a combustion chamber so shaped as to induce swirling of the charge and the scavenging gas.

Figure 1:
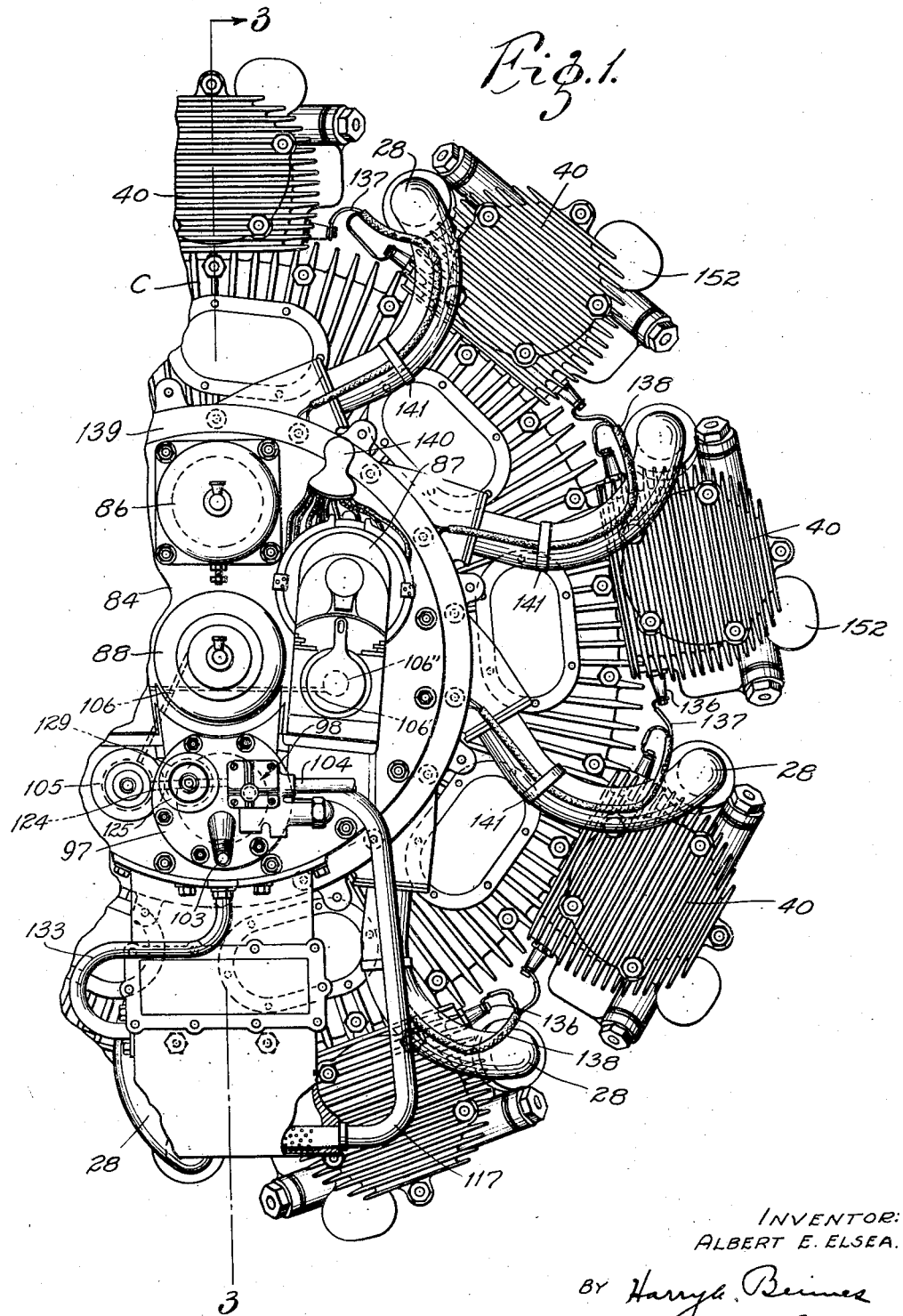
Figure 17:
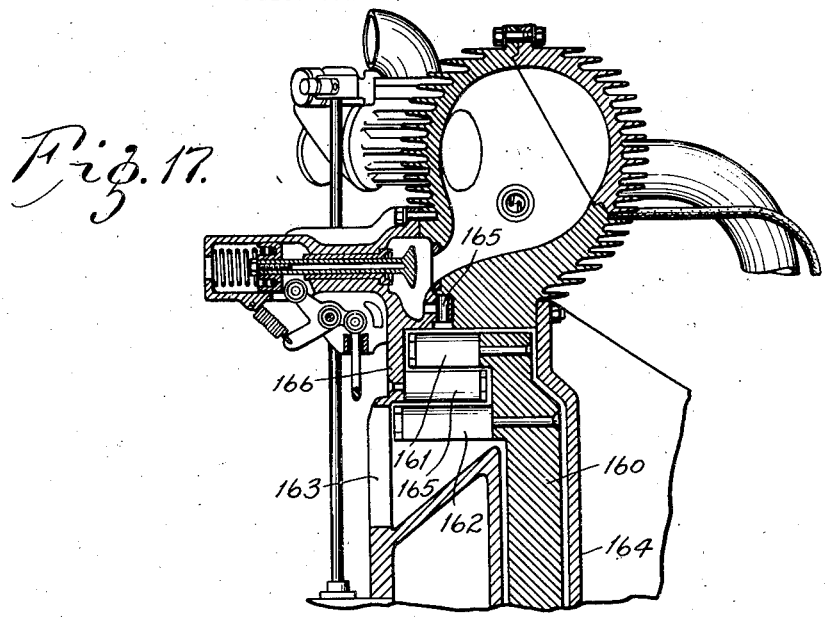
Figure 18:
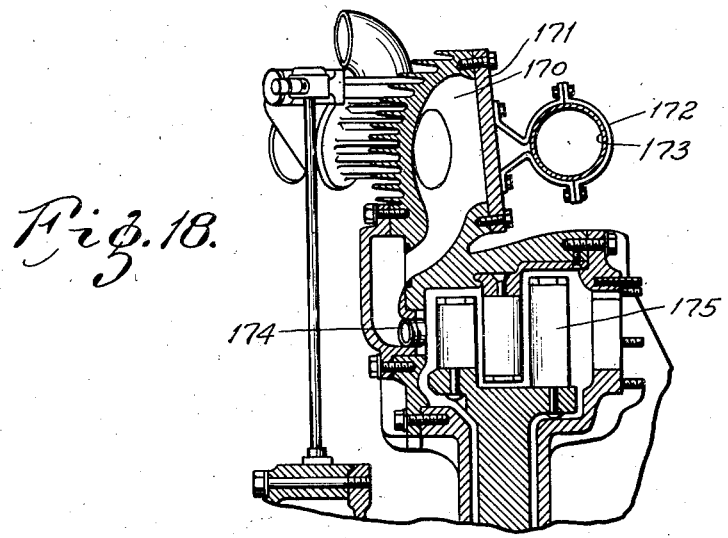

Further and other advantages will be better apparent in a detailed description of the invention in connection with the accompanying drawings, in which:

Figure 1 is a rear end elevation of my improved gas turbine with approximately one half thereof broken away; Fig. 2 is a front elevation of the turbine with approximately one half broken away; Fig. 3 is a vertical longitudinal section of the turbine taken on the line 3—3 of Fig. 1, parts being left in elevation, and the bottom of the casing broken away; Fig. 3a is a section of that part of the casing omitted from Fig. 3; Fig. 4 is a vertical cross section through the second stage compressor taken on the line 4—4 of Fig. 3; Fig. 5 is a vertical cross section taken on the line 5—5 of Fig. 3; Fig. 6 is a side elevation of the turbine rotor with one set of buckets broken away to show the stator buckets behind them, and a section of the stator buckets broken away to show the second set of rotor buckets; Fig. 7 is an elevation looking at the rim of a fragment of the turbine rotor; Fig. 8 is a side elevation of a fragment of the valve operation cam; Fig. 9 is a diagrammatic view of said cam and push rods for the valves of the nine combustion chambers; Fig. 10 is an edge view of the portion of the cam shown in Fig. 8; Fig. 11 is a cross sectional detail of the oil screen; Fig. 12 is a cross sectional detail of the fuel pump and tachometer drive together with the gearing for driving them; Fig. 13 is a vertical section through the scavenging inlet of the combustion chamber showing the scavenging valve and push rod for operating the same; Fig. 14 is a cross sectional detail through the combustion chamber taken on a plane through the inlet and scavenging valves; Fig. 15 is a face view of the combustion valve housing; Fig. 16 is a cross sectional detail taken on the line 16—16 of Fig. 15; Fig. 17 is a vertical longitudinal section through the combustion chamber and adjacent parts of a modified form of the invention; and Fig. 18 is a longitudinal section showing a further modification wherein the turbine is adapted for operation with the exhaust gases of another engine.

Referring to the drawings C represents the engine housing within which there are a series of bearings 1, 2, 3, 4, in which is mounted a shaft 5 which carries the rotating parts of the engine including a fan rotor 6 keyed to the shaft at 7 from which is spaced a second fan rotor 8 keyed to the shaft at 9. The housing C obviously is built in sections to permit assembly of the parts, and the rear section 10 is provided with transverse walls 11 and 12 between which extends a cylindrical wall 13 to form a receiving chamber 14 for the fuel charge which enters through an intake manifold 15. The wall 13 is provided with an inlet opening 16 and the wall 11 is provided with an opening 17 to admit the fuel charge into the compression space of rotor 6 formed between wall 11 and a wall 18 spaced therefrom. A series of equally spaced volute vanes 19 are formed between walls 11 and 18 beyond the periphery of the rotor 6, and between each pair of adjacent vanes 19 is an outlet opening 20 through which the fuel charge after having gone through its first stage of compression discharges into chamber 21 between wall 18 and adjacent wall 22. The walls 18 and 22 form a single casting between compressors. An intermediate casing section 23 has its terminal flange 24 bolted to section 10 and between the transverse wall 25 of casing 23 and wall 22 is formed the compression space for fan rotor 8 to which the charge is admitted through a central opening 26 in wall 22. The housing for rotor 8 is of somewhat greater diameter than the housing for fan rotor 6, but it is likewise provided with volute vanes 27 beyond the periphery of the fan rotor, and the fuel charge is distributed by vanes 27 to the several conduits 28 which are connected to the casing section 23 and equally spaced around the periphery of said casing. The fuel charge is thus forced by the fan 8 through the respective conduits 28 each of which leads to a combustion chamber 29 of which, in the present instance, there are nine forming a part of the engine casing.

The intermediate casing 23 is formed with walls 30 and 31 in spaced relation, the former serving to inclose one side of chamber 32 in which the fan rotor 8 operates, and the latter serving to inclose one side of chamber 33 in which turbine rotor 34 operates. The combustion chambers 29 are formed in casing 35 which is bolted to the peripheral flange 36 of wall 31 and to flange 37 formed on the periphery of wall 38 of casing 39. Casings 23 and 39 thus together inclose the turbine rotor 34. Each of the combustion chambers 29 is adapted to be closed at the rear by a cover plate 40, and each is provided with an opening O adjacent to the initial buckets 41 of the turbine. Into each opening O is fitted a combustion valve and nozzle housing 42 in which is formed a jet nozzle 43 leading from valve chamber 44 which is connected to the combustion chamber 29 by a discharge port 45. The jet nozzle 43 may be detachable (as shown in Fig. 16) so that it may be renewed when necessary. Mounted in housing 42 in a suitable guide 46 is a valve 47 adapted to be held on a seat 48 to close port 45 under the pressure of the coiled spring 49, said spring exerting sufficient pressure to overcome the pressure of the fuel charge within the combustion chamber 29 up to the point of ignition of said charge. Immediately after ignition of the charge the pressure caused by the initial expansion of the gases in the combustion chamber will force the valve 47 to open, in which open position it is held by a trip lever 50 the upper arm 51 of which terminates in a roller z operating through a slot 52 in housing 42 and engages the spring seat 53 to prevent the valve from returning to its seat. The manner of tripping the lever 50 will be explained in connection with the operation of the valves for the combustion chamber.

Spaced from wall 38 of casing 39 is a circular flange 54 to the front surface of which is bolted a hemispherical housing 55 for inclosing the valve operating cam 56 comprising a steel ring 57 on which is formed four equally spaced lobes 58 for lifting the cam followers 59 mounted on the ends of push rods 60. Each of the push rods has a ball and socket connection 61 with the cam follower, and a ball and socket connection 62 with a rocker arm 63 contacting with valve stem 64 of intake valve 65. Cam ring 57 is provided with a second set of lobes 66 lying in a plane parallel and adjacent to lobes 58, the lobes 66 being vectorially immediately ahead of lobes 58 for the proper functioning of the engine as will be explained fully hereinafter. Cam followers 67 are adapted to ride over the lobe 66, each of said followers being connected by a ball and socket joint 68 to a push rod 69 which also has a ball and socket connection 70 at its upper end with a rocker arm 71 engaging the end of stem 72 of scavenging valve 73.

The cam ring 57 is provided with an internal gear 74 and is riveted to a hub 75 journaled on a sleeve 76 keyed to the main shaft 5 and terminating at its forward end in a pinion 77. Thus, the hub 75 is freely rotatable upon the sleeve 76, said sleeve and pinion 77, however, rotating with the shaft 5. The housing 55 is provided with a socket 78 in which is journaled a gear 79 adapted to mesh with pinion 77, and a pinion 80 is formed on the end of stub shaft 81 projecting from gear 79, the pinion 80 being in mesh with the internal gear 74, and the entire gear unit being mounted in a ball bearing 82 supported from a lug 83 on the inside of housing 55. The ratio of the gears just described is such that the cam ring 57 is rotated at ⅛ of the speed of the engine shaft 5, and since there are four of each of the cams 58 and 66 on the cam ring and nine combustion chambers there will obviously be 4½ power impulses for each revolution of the engine shaft.

A hollow end plate 84 is secured to a flange 85 terminating the casing section 10, and a starting motor 86 as well as two magnetos 87, 87, and a generator 88 are supported by the end plate 84. The starting motor is of a conventional type having a clutch-operated pinion 89 adapted to mesh with gear 90 keyed to the main shaft 5. A bearing socket 91 is fixed in the rear end of shaft 5, and a stub shaft 92 is feathered in said socket and supported by a roller bearing 92' fixed to end plate 84. The shaft 92 carries on its outer end one section 93 of a flexible connection, the other section 94 being carried by the generator shaft 95 so that said generator is driven directly by the engine shaft and, of course, at engine speed. The generator 88 is supported on a shelf 96 projecting outwardly from a cylinder 97 formed integrally with the plate 84 and serving to house a fuel pump 98 of a standard construction (preferably of the Viking type). The pump is driven through a hollow shaft 99 on the inner end of which is mounted a gear 100 adapted to mesh with gear 101 formed integrally with the gear 90. The pump is of a type well known in the art and has two sets of rotors, one serving to pull the oil upwardly from sump 102 and discharge it through the outlet 103 to the supply tank (not shown), and at the same time the other rotor pulls it from the supply tank through the inlet 104 discharging the flow of oil through a screen 105 from which the oil is forced through passage 106 into an annular groove 107 formed in the bearing portion of plate 84. From this point the oil discharges through suitable openings 108 into the cavity 109 in shaft 5 whence it is forced by the pressure of the pump behind it through the ports 110, 111, 112 and 113 to the several bearings. There is also a cross-port 106' which leads to the magneto bearings 106''.

The pump rotors 114 and 115 are driven by shaft 116 connected with shaft 99. The oil flows from the sump 102 through pipe 117 into the pump chamber 118 of the rotor 114 and discharges from this chamber into space 119 within cylinder 97 to lubricate shaft 99 and thence through hollow shaft 120 into the space 121 between the oil pump and the fuel pump 122 from which space the oil is forced through the outlet 103 back to the supply tank. The chamber 123 for the pump rotor 115 receives the oil through the opening 104 from the supply tank and forces it through port 124 to the screen 105 mounted adjacent to said oil pump. Screen 105 is fitted into a screen case 131 formed integrally with end plate 84 and the passage 106 communicates with the inside of screen case 131. When the pressure produced by the oil pump exceeds that which is necessary to keep the main bearings lubricated it will be relieved by the unseating of a ball check 132 at the end of the screen which permits a flow from the screen directly into the hollow end plate 84 through ports $t, t$ as shown in Fig. 11. A casing 125 is mounted over the outer end of the oil pump and houses a fuel pump 126 driven by gear 127 in mesh with a gear 128 on shaft 116. There is also a tachometer drive mounted in housing 125 comprising a gear 129 mounted on shaft 130, the gear 129 also being in mesh with gear 128. Figures 3 and 3a show a series of oil return pipes 133, 134 and 135 leading from various parts of the engines to the sump 102 which is formed on the section 10 adjacent to the fuel intake 15.

Each combustion chamber 29 is provided with oppositely disposed spark plugs 136, 136, and a conductor 137 has its outer end connected to each spark plug. Conductors 137 for the spark plugs of adjacent cylinders are inclosed within a protective tube 138, the conductors thus being led in pairs into a suitable ring-case 139. Since there are nine combustion chambers and each has two spark plugs there will be eighteen conductors nested within the case 139, nine of which are brought out of the case 139 through each of two suitable outlets 140 immediately above the magnetos 87, 87 for connection with the magneto distributor. The conductor tubes 138 are preferably carried from the spark plugs to the ring-case 139 along the intake manifold or conduit 28 to which they may be secured by suitable clamps 141.

Bearing 4 is of the inclosed type (as illustrated in Fig. 3) so as to prevent the escape of the gas from the chamber 14, and an oil slinger $a$ to assist in lubrication of the bearing is provided on the side of the bearing adjacent to gear wheel 90. Bearings 3, 2 and 1 are also provided with oil slingers $b, c$ and $d$ respectively.

It will be seen by referring to Figures 6 and 7 that the rotor 34 is provided with oppositely disposed peripheral flanges $e, e'$, the flange $e$ being of a greater diameter than flange $e'$ and having the buckets 41 secured to it by pins 41' which pass through openings $f$ in the flange, the pins being riveted over on the under side of the flange. Flange $e'$ carries buckets 142 somewhat greater in length than buckets 41, said buckets being provided with pins 142' passing through openings $f'$ in the flange, and the pins being riveted over on the under side of the flange. The stator of the turbine comprises a sectional ring 143 secured to the inner surface of casing 35 and buckets 144 are fixed to said ring by means of pins 145. The ends of said pins are riveted into the depression 146 formed in the ring for this purpose. It will be observed that the arrangement of the rotor buckets or blades with relation to the stator is such that there is but slight clearance so as to produce a close running turbine in which the resistance due to the pressure and vacuum created by the rapidly moving buckets is reduced to a minimum. The buckets of each set are also closely nested, and each of the buckets 41 is provided with a top flange 41'' having a depression $g$ formed in one radial edge $i$ and an enlargement $j$ corresponding with the forward surface of the bucket formed on the edge $k$. The dimensions of the flanges 41″ are such that when the buckets 41 are assembled edges $i$ butt against edges $k$, and the grooves $g$ receive enlargements $j$ so that the combined flanges 41″ will form a closed flange or ring encircling the buckets. This construction not only provides great rigidity, but also holds the buckets against warping under the great heat to which they are subjected. Since the buckets 142 are constructed identical with buckets 41 they will not be further described. Stator buckets 144 are constructed similarly to the rotor buckets except that the flanges 144′ interlock in like manner with those of the rotor buckets, but form an inside ring instead of an outside ring. The rotor 34 is mounted in place on shaft 5 before the casing section 35 is placed and before the stator is placed. The stator ring sections 143 with the buckets 144 fixed to them may now be slipped in place, after which the casing section 35 is put into position so as to receive the edge of the ring sections 143. The stator is then firmly held between sections 35 and 31.

The construction of the intake valve 65 and the scavenging valve 73 is identical except that the inlet to the intake valve chamber 65′ is on the side of said chamber while the inlet to the scavenging valve chamber 73′ is at the top of said chamber. Therefore, a further description of the intake valve 65 will also serve for the scavenging valve 73. Intake valve 65 is adapted to be held on its seat 147 by a pair of nested springs 148 enveloping the outer end of valve stem 64, said springs exerting an expansive force against their seat 149 on the valve housing 150 and against a collar 151 fixed to valve stem 64. The expansion of springs 148 also operates to maintain the rocker arm 63 in its normal position to hold down the push rod 60. Of course, after the push rod is lifted by the valve cam the tension of spring 148 will be overcome and valve 65 will be forced inwardly off its seat 147.

The trip lever 50 has an arm 51′ angularly disposed with relation to arm 51 and an arm 51″ disposed oppositely to arms 51 and 51′. A coiled spring $s$ is connected to the end of arm 51′ and to the bottom of housing 42, said spring serving to rotate the trip lever 50 in a direction that will force downwardly connecting rod $x$ engaging the extremity of arm 51″. The lower end of rod $x$ is rigidly connected to push rod 60 so that when the rod 60 is raised to open the intake valve the rod $x$ will also be raised so as to rock trip lever 50 to permit the release therefrom of the valve 47 which is now forced to its seat 48 by the pressure of spring 49.

The operation of my improved gas turbine is as follows:

After closing the ignition switch, the starter 86 is actuated to rotate shaft 5 which causes a charge of fuel to be sucked through intake manifold 15 from the carbureter (not shown), said charge undergoing two stages of compression by compressor rotors 6 and 8, the latter forcing the compressed gas through the conduits 28 to the respective combustion chambers 29. A reference to diagrammatic view (Fig. 9) will show that one of the cam lobes 58 has raised the push rod 60 leading to combustion chamber numbered 1, to open the intake valve so that the fuel will be charging into this combustion chamber. Immediately after the cam lobe 58 has passed the cam followers of combustion chamber No. 1, the charge in this combustion chamber is fired, at which instant all of the valves of No. 1 chamber are closed (as shown by the diagram). The force of the expanding gases now instantly opens the combustion valve 47, said valve being held open by the trip lever 50 to allow the expanding gases and products of combustion to pass into and through the jet nozzle 43 which directs them against the initial turbine buckets 41 through which the gases pass to the reversing buckets 144 which reverse the flow of gases (as in the ordinary turbine) so that these expanding gases may continue to exert their force on the secondary buckets 142. An inspection of Figure 9 will show that the time of this impulse is equal to the time expended in charging the combustion chamber. Vectorially the time of charging is ⅕ of a cycle and the time of the power impulse the same. At the expiration of the interval of the power impulse the cam lobe 66 operates to lift the push rod 69 off the scavenging valve, opening said valve and allowing atmospheric air or air under pressure to enter combustion chamber number 1. In the present instance air under compression is admitted into the compression chamber from the compressor, together with the fuel, said mixed air and fuel entering the compressor through the intake pipe 15 leading from a suitable fuel and air mixing device (not shown). The period of time for scavenging is three times that of either the charge or impulse period (as shown in the diagram), at the conclusion of which period the lobe 66 has left the cam follower of scavenging valve of chamber No. 1 whereupon the intake valve is immediately opened by the lobe 58 which is 90 degrees behind the preceding lobe 58 with which this operation was started. Thus, combustion chamber number 1 goes through four cycles of operation for each revolution of the cam 57 as, of course, do the other combustion chambers in the time relation indicated by the numbers from 1 to 9 on the diagram. As heretofore described the raising of any intake valve push rod also raises the rod *x* associated with it to release the combustion valve of that particular combustion chamber.

In Fig. 17 I show a modification of the invention in which, the turbine rotor 160 has buckets 161 and 162 disposed radially instead of peripherally, and the outlet 163 for the spent gases is at the front of the rotor housing 164 instead of the back. Obviously, the jet nozzle 165 is adapted to the change in the location of the buckets. The stator buckets 165 are secured to rotor housing plate 166.

A further modification is shown in Fig. 18 wherein each of the chambers 170 is provided with a flat cover plate 171 on which is mounted a bracket 172 for supporting a conduit 173 which may be connected to the exhaust of another engine (either of the turbine type or some other type). The exhaust gases are then conducted from the conduit or manifold 173 to the chamber 170 through an inlet valve similar to that of the main form and pass from the chamber to the nozzle 174 to exert their energy on the turbine 175. The chamber 170 is properly speaking a receiving chamber as there is no ignition in this adaptation of the invention.

Having described my invention, I claim:

A gas turbine comprising a suitable housing, said housing enclosing a turbine chamber, and a plurality of combustion chambers adjacent thereto, the turbine chamber and each combustion chamber having a passageway therebetween, a fuel intake valve and a scavenging valve in each combustion chamber, means for igniting the fuel charge, a shaft mounted in the housing, a turbine wheel mounted on said shaft and rotatable in the turbine chamber, a combustion valve in said passageway, means for holding said valve closed during the charging of the combustion chamber, said means being adapted to yield and allow the valve to open under the initial force of the explosion in the combustion chamber, a valve holding device adapted to engage the combustion valve to hold it open, a valve operating cam mounted on the shaft, said cam having suitable formations for operating the intake valve and the scavenging valve in proper timed relation, valve mechanism between said valves and cam, and means on the intake valve mechanism for tripping the combustion valve holding means to allow the valve to close at the end of the cycle.

In testimony whereof I hereunto affix my signature.

ALBERT E. ELSEA.